(12) United States Patent
McCormick

(10) Patent No.: X6500
(45) Date of Patent: Apr. 20, 1831

(54) GRIST MILL, & SELF-STOPPER

(76) Inventor: Robert McCormick

United States Patent Patent No.: X6500

Robert McCormick of Augusta County Virginia

Letters Patent.

The schedule referred to in these Letters Patent and making part of the same containing a description in the words of the said Robert McCormick Jun<sup></sup> himself of his improvement in the Grist Mill called a "Self Stopper for Stopping Motion of Mills"

Be it known that I Robert McCormick Jr of Augusta County State of Virginia have invented a new and useful improvement in the Grist Mill called a "Self Stopper for Stopping the motion of mills" which is described as follows. A false inside hopper is made so as to fit the bottom or lower part of the common stationary hopper. This hopper is suspended by a cord, strap or chain, connected to a small lever overhead the fulcrum of which is nearer to one of its ends than to the other. the longest part of which is connected also by a cord strap or chain running over a pulley to a weight which plays up and down according to the state of the hopper sinking when the hopper is free from grain. This weight dependant upon the state of the hopper for its action is suspended within a frame [illegible] channel composed of three sides of a square which are stationary: the gate arm which will be hereafter described making the fourth or front side. The inner side of the weight is bevelled off for about nine inches at an angle of about 45° leaving space sufficient in one of its sides to admit it to pass a pin upon which the gate arm is fixed till the greatest thickness of the inclined part of the weight comes in contact with the end of a rod that throws off the gate arm. This last mentioned rod is horizontally placed and one end connected with the shoe of the hopper from which it receives motion alternately backward and forward and the other running through the back side of the weight frame or channel. The gate arm through which the stationary pin projects in one of its regulating holes as in all mills, is suspended by a horizontal lever overhead running from one of the sides of the mill, and [illegible] by another at right angles made so as to be adapted to mills of the old construction.

Connected to or rather passing through the first mentioned horizontal lever is the one that supports it which serves by a cord and hook to raise the [illegible] by which the stones may be let down when necessary. Connected to the the outer or extreme end of the lever which supports the gate arm is attach
-ed the main horizontal lever which is common to all mills this main lever
is supported as usual by an upright piece of timber which constitutes its fu[illegible]
-crum. The other end of the lever sustains the main gate near and on one side
of which is placed an iron pin for the opening of the alarm gate supported by
a small upright a small lever of equal arms is upheld, on the inner arm of which
is suspended a plate of iron with a catch at its lower end called an inclined
catch This catch is inclined for about six inches at an angle of about 35° the diam
-eter of the catch lessening one half to form a projection whereon the main gate
pin is lodged. To the other end of the small lever is attached the arm of the alarm
gate which is operated upon by the motion of the lever to which it is connected and
the alarm gate permits the water to flow on a small wheel outside that rings a
bell. Operation The water being let on, the hopper shaft or by millers called the
damsel, is turned round rapidly which operates on the shoe that gives an alter-
-nate motion backward and forward and causes the false hopper to be emp
-tied of its grain. When the hopper is raised by the hopper weight; the gate
arm being let off by the horizontal action of the rod against the inclined [illegible]
of the weight pressing off the gate arm and thus by its connection with the
main gate arm stops the motion of the mill; the false hopper being kept down
by the pressure of the grain and will not rise again till the grain be carried
off. What I claim as my invention and for which I Ask a Patent is the false
hopper the lever &c by which it is suspended: the weights as constructed and the
channel in which it plays up and down: the horizontal rod as connected to
the shoe and the combination of the several parts as above described.

Witnesses
Wm P Elliot
Chas M Keller

Robt McCormick Jr